US008787654B2

(12) United States Patent
Zhang et al.

(10) Patent No.: US 8,787,654 B2
(45) Date of Patent: Jul. 22, 2014

(54) SYSTEM AND METHOD FOR MEASURING POTENTIAL EYESTRAIN OF STEREOSCOPIC MOTION PICTURES

(75) Inventors: Dong-Qing Zhang, Plainsboro, NJ (US); Ana B. Benitez, New York, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 860 days.

(21) Appl. No.: 12/991,969

(22) PCT Filed: May 12, 2008

(86) PCT No.: PCT/US2008/006036
§ 371 (c)(1),
(2), (4) Date: Jan. 18, 2011

(87) PCT Pub. No.: WO2009/139740
PCT Pub. Date: Nov. 19, 2009

(65) Prior Publication Data
US 2011/0142309 A1 Jun. 16, 2011

(51) Int. Cl.
*G06K 9/00* (2006.01)
*H04N 13/00* (2006.01)
*H04N 17/00* (2006.01)

(52) U.S. Cl.
CPC ........... *H04N 17/00* (2013.01); *H04N 13/0033* (2013.01); *H04N 2213/002* (2013.01); *H04N 13/0022* (2013.01)
USPC ........... 382/154; 382/100; 345/418; 345/419; 348/42; 348/46; 348/47; 348/51; 359/462; 359/466; 359/467

(58) Field of Classification Search
None
See application file for complete search history.

(56) References Cited

U.S. PATENT DOCUMENTS 6,163,337 A * 12/2000 Azuma et al. .................... 348/43
6,614,927 B1 * 9/2003 Tabata ........................ 382/154
(Continued)

FOREIGN PATENT DOCUMENTS

CN 1838778 9/2006
JP 10052402 2/1998
(Continued)

OTHER PUBLICATIONS

Yano et al. "A study of visual fatigue and visual comfort for 3D HDTV/HDTV images", 2002, Elsevier Science B.V. Displays 23, pp. 191-201.*

(Continued)

*Primary Examiner* — Matthew Bella
*Assistant Examiner* — Jason Heidemann
(74) *Attorney, Agent, or Firm* — Robert D. Shedd; Vincent E. Duffy; James McKenzie (57) ABSTRACT

A system and method for measuring the potential eyestrain felt by audiences while watching a 3D presentation, e.g., a stereoscopic motion picture, are provided. The eyestrain measurement system and method of the present disclosure is based on the measurement of disparity (or depth) and disparity transition of stereoscopic images of the 3D presentation. The system and method of the present disclosure provide for acquiring a first image and a second image from a first segment, estimating disparity of at least one point in the first image with at least one corresponding point in the second image, estimating disparity transition of a sequence of first and second images, and determining potential eyestrain felt while viewing the 3D presentation based on the disparity and the disparity transition of the sequence of the first and second images.

18 Claims, 8 Drawing Sheets

(56) References Cited

U.S. PATENT DOCUMENTS

| | | | | |
|---|---|---|---|---|
| 8,224,067 | B1* | 7/2012 | Sayre et al. | 382/154 |
| 2006/0021526 | A1 | 2/2006 | Martin et al. | |
| 2006/0203085 | A1* | 9/2006 | Tomita | 348/51 |
| 2007/0120972 | A1* | 5/2007 | Kim et al. | 348/51 |
| 2007/0156348 | A1 | 7/2007 | Bae et al. | |

FOREIGN PATENT DOCUMENTS

| | | |
|---|---|---|
| JP | 11355808 | 12/1999 |
| JP | 2004298290 | 10/2004 |
| JP | 2005 177076 A | 7/2005 |

OTHER PUBLICATIONS

McVeigh et al. "Algorithm for automated eye strain reduction in real stereoscopic images and sequences", Apr. 22, 1996, Proc. SPIE 2657, Human Vision and Electronic Imaging, 307.*

Emoto et al. "Repeated vergence adaptation causes the decline of visual functions in watching stereoscopic television," 2005, Journal of Display Technology 1(2), 328-340.*

Yano et al., "Two factors in visual fatigue caused by stereoscopic HDTV images," 2004, Displays 25(4), 141-150.*

Search Report did Oct. 30, 2008.

* cited by examiner

Instant Eyestrain Function and Overall Eyestrain Measure

US 8,787,654 B2

SYSTEM AND METHOD FOR MEASURING POTENTIAL EYESTRAIN OF STEREOSCOPIC MOTION PICTURES

This application claims the benefit under 35 U.S.C. §365 of International Application PCT/US2008/006036, filed May 12, 2008, which was published in accordance with PCT article 21(2) on Nov. 19, 2009.

TECHNICAL FIELD OF THE INVENTION

The present disclosure generally relates to computer graphics processing and display systems, and more particularly, to a system and method for measuring potential eyestrain felt by audiences watching a three-dimensional (3D) presentation, e.g., a stereoscopic motion picture.

BACKGROUND OF THE INVENTION

Stereoscopic imaging is the process of visually combining at least two images of a scene, taken from slightly different viewpoints, to produce the illusion of three-dimensional depth. This technique relies on the fact that human eyes are spaced some distance apart and do not, therefore, view exactly the same scene. By providing each eye with an image from a different perspective, the viewer's eyes are tricked into perceiving depth. Typically, where two distinct perspectives are provided, the component images are referred to as the "left" and "right" images, also know as a reference image and complementary image, respectively. However, those skilled in the art will recognize that more than two viewpoints may be combined to form a stereoscopic image.

In 3D post-production, VFX workflow and 3D display applications, an important process is to infer a depth map from stereoscopic images consisting of left eye view and right eye view images to create stereoscopic motion pictures. For instance, recently commercialized autostereoscopic 3D displays require an image-plus-depth-map input format, so that the display can generate different 3D views to support multiple viewing angles.

The process of inferring the depth map from a stereo image pair is called stereo matching in the field of computer vision research since pixel or block matching is used to find the corresponding points in the left eye and right eye view images. Depth values are inferred from the relative distance between two pixels in the images that correspond to the same point in the scene.

Stereo matching of digital images is widely used in many computer vision applications (such as, for example, fast object modeling and prototyping for computer-aided drafting (CAD), object segmentation and detection for human-computer interaction (HCI), video compression, and visual surveillance) to provide three-dimensional (3-D) depth information. Stereo matching obtains images of a scene from two or more cameras positioned at different locations and orientations in the scene. These digital images are obtained from each camera at approximately the same time and points in each of the image are matched corresponding to a 3-D point in space. In general, points from different images are matched by searching a portion of the images and using constraints (such as an epipolar constraint) to correlate a point in one image to a point in another image. The matched images and depth map can then be employed to create stereoscopic 3D motion pictures.

One of the main problems of the current stereoscopic 3D motion pictures is that the audience may feel eyestrain after some time of watching the motion pictures. Therefore, when directors make 3D films, they have to consider how to shoot the scene or edit the film in such a way that the eyestrain felt by audiences can be minimized. This is part of the reason that making 3D motion pictures is much more difficult and time-consuming than making conventional 2D motion pictures.

The challenge in making 3D motion pictures is that it's very difficult for directors or editors to visually estimate the potential eyestrain felt by audiences. There are several factors contributing to this difficulty. First, the director or editor has to watch a 3D motion picture long enough to feel eyestrain because eyestrain is an accumulative effect along the process of watching the motion picture. Eyestrain is usually not caused because of a small number of segments. Second, eyestrain could also be caused by abrupt depth changes between two segments. It is difficult for editors to measure the potential eyestrain caused by the abrupt depth changes when they concatenate segments during editing. They would need to use a time-consuming trial-and-error process to concatenate different segments and "feel" the potential eyestrain caused by depth transition.

Therefore, a need exists for techniques that can measure the potential eyestrain felt while viewing a 3D presentation such as a stereoscopic motion picture. Furthermore, there is a need for automatic systems and methods that can measure the potential eyestrain during the process of editing a 3D motion picture.

SUMMARY

A system and method for measuring the potential eyestrain felt by audiences while watching a 3D presentation, e.g., a stereoscopic motion picture, are provided. The system and method of the present disclosure takes into account that the distance between a convergence point and focus point of eyes while viewing a 3D presentation is closely related to the depth of focused objects, which also relates to the disparity of the pixels of the objects. The eyestrain measurement system and method of the present disclosure is based on the measurement of disparity (or depth) and disparity transition of stereoscopic images of the 3D presentation. The techniques of the present disclosure are useful for directors and editors to efficiently make comfortable 3D movies.

According to one aspect of the present disclosure, a method of measuring potential eyestrain felt while viewing a three-dimensional (3D) presentation is provided, the method including acquiring a first image and a second image from a first segment, estimating disparity of at least one point in the first image with at least one corresponding point in the second image, estimating disparity transition of a sequence of first and second images, and determining potential eyestrain felt while viewing the 3D presentation based on the disparity and the disparity transition of the sequence of the first and second images.

In another aspect, the estimating the disparity transition step includes estimating the disparity of a last frame of a previous segment, estimating the disparity of a first frame of the first segment, and determining the difference between the disparity of the last frame of the previous segment and the disparity of the first frame of the first segment.

In one aspect, the estimating the disparity transition step includes estimating the disparity within each frame of a plurality of frames of the first segment, and determining the difference between the disparity of each of the frames of the first segment.

In a further aspect, the determining potential eyestrain step further includes determining an instant eyestrain function for each frame of a sequence of first and second images.

In yet another aspect, the determining potential eyestrain step further includes applying a decaying factor to the instant eyestrain function for each frame of the sequence of first and second images.

In another aspect, the determining potential eyestrain step further includes accumulating the decayed instant eyestrain function for each frame of the sequence of first and second images over a predetermined period of time.

In a further aspect, the determining potential eyestrain step further includes saturating the accumulated the eyestrain function over the sequence of first and second images.

In another aspect, the method further includes determining if the potential eyestrain is acceptable, and if the potential eyestrain is not acceptable, correcting the disparity of the first and second image.

According to another aspect of the present disclosure, a system for measuring potential eyestrain felt while viewing a three-dimensional (3D) presentation is provided. The system includes means for acquiring a first image and a second image from a segment, disparity estimator for estimating disparity of at least one point in the first image with at least one corresponding point in the second image, a disparity transition estimator for estimating disparity transition of a sequence of first and second images, and eyestrain estimator for determining potential eyestrain felt while viewing the 3D presentation based on the disparity and the disparity transition of the sequence of the first and second images.

According to a further aspect of the present disclosure, a program storage device readable by a machine, tangibly embodying a program of instructions executable by the machine to perform method steps for measuring potential eyestrain felt while viewing a three-dimensional (3D) presentation is provided, the method including acquiring a first image and a second image from a first segment, estimating disparity of at least one point in the first image with at least one corresponding point in the second image, estimating disparity transition of a sequence of first and second images, and determining potential eyestrain felt while viewing the 3D presentation based on the disparity and the disparity transition of the sequence of the first and second images.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
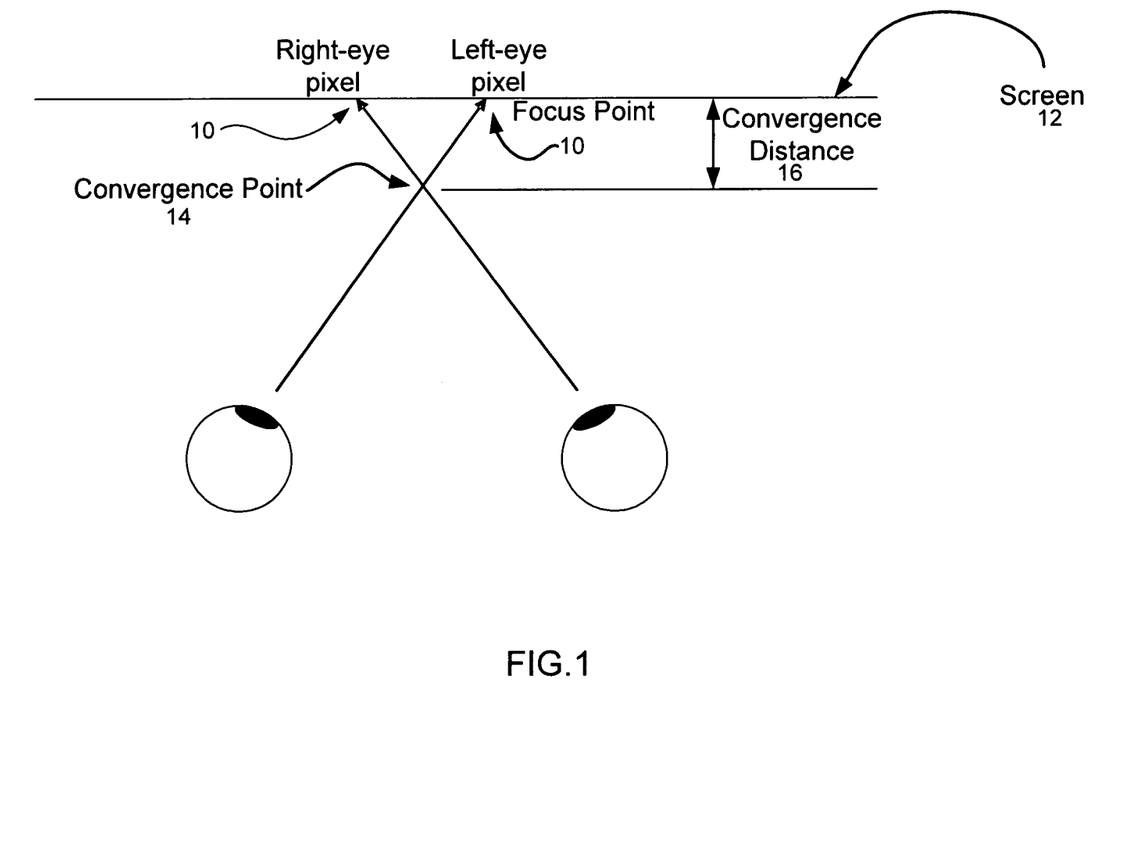
FIG. 1 illustrates a convergence point and focus point experienced by a viewer or a member of an audience while viewing a three-dimensional (3D) presentation.

Generally, stereoscopic motion pictures consist of left-eye and right-eye picture sequences. For cinema applications, audiences usually have to wear 3D glasses (e.g., polarized or shutter glasses) to watch 3D presentations. For glasses-free displays, although the mechanism of 3D displays is different, the principle of 3D perception is the same. That is, the 3D system will make the left eye see the left-eye images while the right eye only sees the right-eye images. The human brain is able to combine these two images together to correctly perceive the 3D scenes. However, this system could potentially cause the fatigue of eye muscles and eyestrain because of the following two reasons:

1. The convergence point and the focus point of the eyes are different. When we look at real 3D scenes, the focus point of our eyes is approximately the same as the convergence point. However, when we watch 3D films, the focus point 10 of our eyes has to be always on the screen 12, while the convergence point 14 of our eyes has to be in front of or behind the screen 12 in order to perceive the correct 3D scenes as illustrated in FIG. 1. This discrepancy is the primary factor contributing to the strain of eye muscles therefore causing eyestrain.

2. The depth changes of the objects in 3D motion pictures. When the depth of an object changes, our eyes have to adjust the convergence point to perceive the correct 3D effect, while keeping the focus point on the screen. If depth changes are frequent and abrupt, our eyes have to frequently change the convergence point, resulting in the exhaustion of eye muscles. So, in short, eyestrain is primarily caused by two factors: 1) the distance between the convergence point and focus point for the eyes (i.e., convergence distance 16 as shown in FIG. 1); and, 2) changes of the convergence point 14. Therefore, measuring eyestrain needs to take into account the above two factors.

The present disclosure provides a system and method for measuring the potential eyestrain felt by audiences while watching a 3D presentation, e.g., a stereoscopic motion picture. The eyestrain measurement system and method of the present disclosure is based on the measurement of disparity (or depth) and disparity transition. The solution is useful for directors and editors to efficiently make good and comfortable 3D movies.

Figure 2:
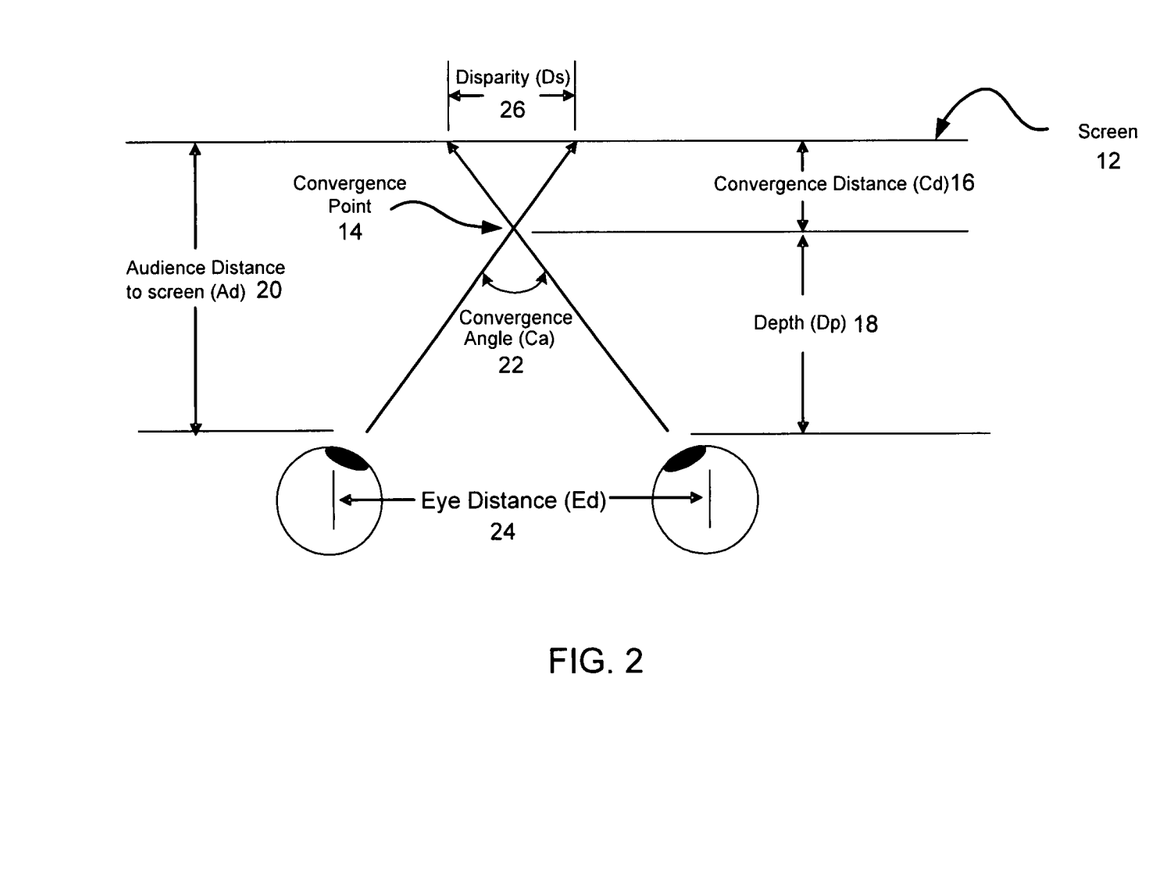
FIG. 2 illustrates the relationship of convergence distance, perceived depth, disparity and convergence angle when the convergence point is in front of a screen employed for showing a 3D presentation.

The system and method of the present disclosure takes into account that the distance between the convergence point and focus point of a viewer's eyes is closely related to the depth of the focused objects in a 3D presentation, which also relates to the disparity of the pixels of the objects. FIG. 2 shows the relationship of the variables involved in watching a 3D presentation. It can be seen that the following relations exist given the Convergence Distance (Cd) 16, Perceived Depth (Dp) 18, Audience Distance (Ad) 20, Convergence Angle (Ca) 22, Eye Distance (Ed) 24 and Disparity (Ds) 26.

1. Relation of Cd, Dp and Ad: Ad=Cd+Dp.
2. Relation of Cd, Ds, Ad and Ed: Cd(1/Ds+1/Ed)=Ad/Ed
3. Relation of Ca, Ed, Ad and Cd: Ca=2 a tan(Ed/(2(Ad−Cd)))

Figure 3:
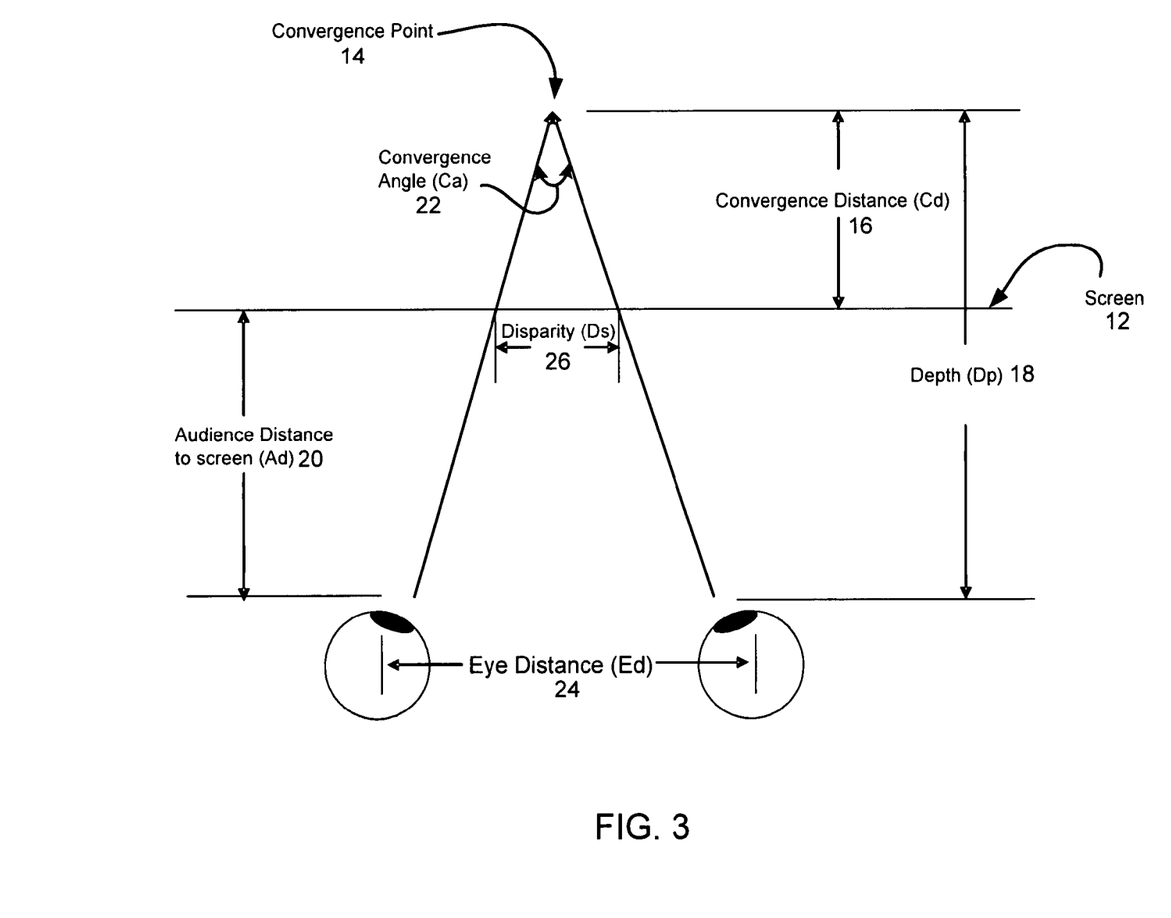
FIG. 3 illustrates the relationship of convergence distance, perceived depth, disparity and convergence angle when the convergence point is behind the screen.

These relations remain correct when the convergence point is behind the screen as shown in FIG. 3 as long as negative disparity and negative convergence distance are allowed. For a particular audience, Eye Distance (Ed) 24 and Audience Distance (Ad) 20 are constant during a presentation, while Convergence Distance (Cd) 16, Perceived Depth (Dp) 18, Convergence Angle (Ca) 22 and Disparity (Ds) 26 vary during the motion picture. Based on these relations, the calculation of the convergence point can be simplified to the estimation of the depth or disparity. This results in simpler estimation algorithms. Since numerous disparity estimation algorithms exist, conventional disparity measurement can be employed for eyestrain estimation.

Figure 4:
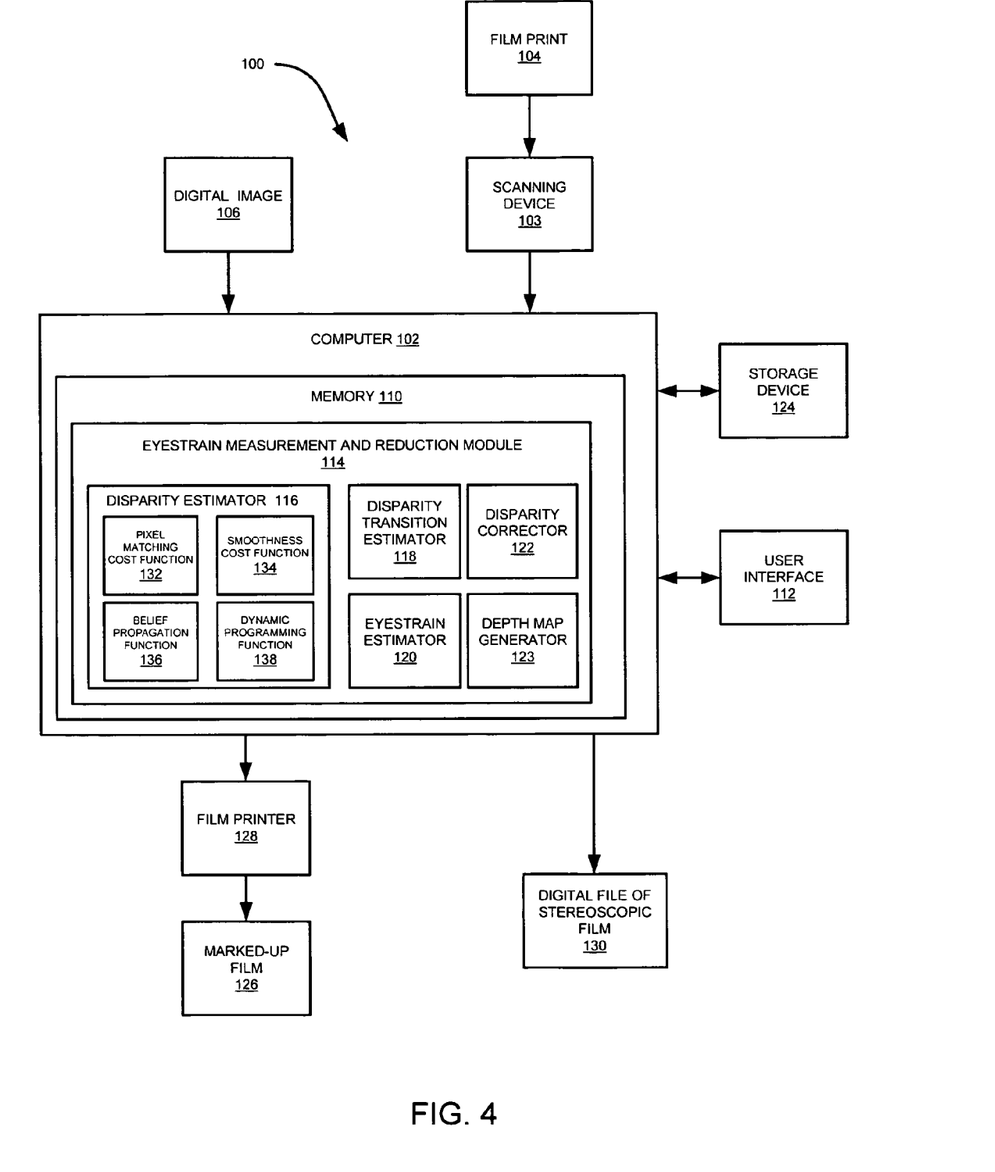
FIG. 4 is an exemplary illustration of a system for measuring eyestrain felt while watching a three-dimensional (3D) presentation according to an aspect of the present disclosure.

Referring now to FIG. 4, exemplary system components according to an embodiment of the present disclosure are shown. A scanning device 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes, etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printed a revised version of the film 126, e.g., a stereoscopic version of the film, wherein a scene or a plurality of scenes may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes an eyestrain measurement and reduction module 114 stored in the memory 110 for measuring the potential eyestrain felt by an audience or viewer while watching a 3D presentation.

The eyestrain measurement and reduction module 114 includes a disparity estimator 116 configured for estimating the disparity of at least one point in a first image with at least one corresponding point in the second image (the first and second image resulting in a stereo image pair) and for generating a disparity map from the estimated disparity for each of the at least one point in the first image with the at least one corresponding point in the second image. The disparity estimator 118 includes a pixel matching cost function 132 configured to match pixels in the first and second images and a smoothness cost function 134 to apply a smoothness constraint to the disparity estimation. The disparity estimator 118 further includes a belief propagation algorithm or function 136 for minimizing the estimated disparity and a dynamic programming algorithm or function 138 to initialize the belief propagation function 136 with a result of a deterministic matching function applied to the first and second image to speed up the belief propagation function 136. It is to be appreciated that belief propagation and dynamic programming are only two exemplary methods for determining disparity and that other disparity estimating methods and algorithms may be employed by disparity estimator 116.

A disparity transition estimator 118 is provided for determining a transition or change in disparity of stereoscopic images. An eyestrain estimator 120 is provided for estimating the potential eyestrain based on a disparity map from the disparity estimator 118 and the disparity transition of the associated images from the disparity transition estimator 120.

The eyestrain measurement and reduction module 114 further includes a disparity corrector 122 for adjusting the disparity between the first and second images to reduce potential eyestrain. A depth map generator 123 for converting the disparity map into a depth map by inverting the disparity values of the disparity map is also provided. In one embodiment, the depth map generator 123 works in conjunction with the disparity corrector 122 for reducing the potential eyestrain as will be described below.

Figure 5:
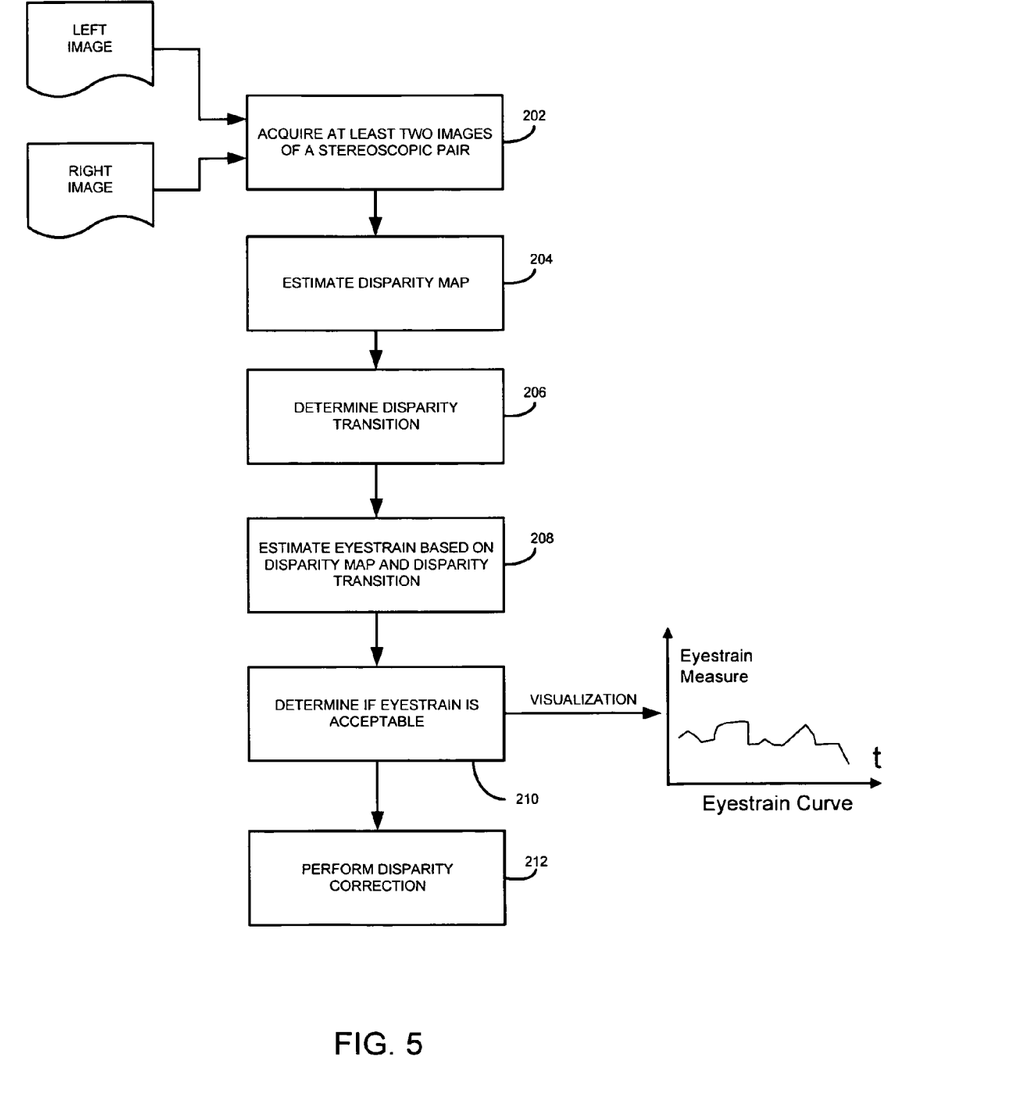
FIG. 5 is a flow diagram of an exemplary method for measuring eyestrain felt while watching a three-dimensional (3D) presentation according to an aspect of the present disclosure.

FIG. 5 is a flow diagram of an exemplary method for measuring potential eyestrain of at least two two-dimensional (2D) images according to an aspect of the present disclosure. Initially, the post-processing device 102 acquires at least two two-dimensional (2D) images, e.g., a stereo image pair with left and right eye views (step 202). The post-processing device 102 may acquire the at least two 2D images by obtaining the digital master image file in a computer-readable format. The digital video file may be acquired by capturing a temporal sequence of moving images with a digital camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital image file will include one image, e.g., $I_1$, $I_2$, ... $I_n$.

Stereoscopic images can be taken by two cameras with the same settings. Either the cameras are calibrated to have the same focal length, focal height and parallel focal plane; or the images have to be warped based on known camera parameters as if they were taken by the cameras with parallel focal planes. This warping process includes camera calibration and camera rectification. The calibration and rectification process adjust the epipolar lines of the stereoscopic images so that the epipolar lines are exactly the horizontal scanlines of the images. Since corresponding point finding happens along the epipolar lines, the rectification process simplifies the correspondence search to searching only along the scanlines, which greatly reduces the computational cost. Corresponding points are pixels in images that correspond to the same scene point.

Next, in step 204, the disparity map is estimated for every point in the scene, e.g., a frame, via the disparity estimator 116. The disparity for every scene point is calculated as the relative distance of the matched points in the left and right eye images i.e., find the pixels in the right and left images that correspond to the same scene point. For example, if the horizontal coordinate of a point in the left eye image is x, and the horizontal coordinate of its corresponding point in the right eye image is x', then the disparity d=x'-x.

In one embodiment of estimating the disparity, initially, a stereoscopic pair of images is acquired. A disparity cost function is computed including computing a pixel matching cost function 132 and computing a smoothness cost function 134. A low-cost stereo matching optimization, e.g., a dynamic programming function 138, is performed to get initial deterministic results of stereo matching the two images. The results of the low-cost optimization are then used to initialize a belief propagation function 136 to speed up the belief propagation function for minimizing the disparity cost function. It is to be appreciated that other method for disparity estimation are known in the art and may be employed by the system and method of the present disclosure.

In step 206, the disparity transition is determined. There are basically two types of disparity transition: disparity transition between film segments (e.g., scenes, shots and the like) which could be abrupt and disparity transition within film segments (e.g., scenes, shots and the like) which is often continuous. As discussed below, a segment means a sequence of frames containing the same content.

Disparity transition between segments is usually discontinuous and abrupt. So to measure the disparity transition, the disparity map of the last frame of previous segment and the beginning frame of the current segment is estimated first. In other words, assuming the disparity map at the end of the ith segment is $D_i$ and the disparity map at the beginning of the (i+1)th segment is $D_{i+1}$, then, the disparity difference is $$\delta D = D_{i+1} - D_i. \qquad (1)$$

To measure the magnitude of the depth change, the absolute disparity difference is used $$|\delta D| = |D_{i+1} - D_i|. \qquad (2)$$

To get the overall disparity change, either the maximum disparity transition is used, which is $$\delta D_{max} = \max_{(x,y)} |\delta D(x, y)| \qquad (3)$$

or the average disparity transition is used, which is $$\delta D_{aver} = \frac{1}{WH} \sum_{(x,y)} |\delta D(x, y)|, \qquad (4)$$

where W and H are the width and height of the disparity map.

For pictures within segments, the disparity transition is often continuous, but large disparity transitions in small amounts of time would also contribute to eyestrain for audiences. Similar to disparity changes between segments, the disparity difference can be used as a measurement, i.e., $\delta D = D_{i+1} - D_i$. However, this measurement will be performed at every frame rather than just at the boundary of segments. Here, the average disparity value over pixels within a frame rather than across frames is determined and then the difference between each consecutive frame is calculated.

Eyestrain is caused by large disparity and/or disparity changes. Therefore, in step 208, eyestrain is estimated based on the disparity map and the disparity transition. The system and method of the present disclosure utilizes a very rough eyestrain model. The system and method assume there is a function that relates the eyestrain with the disparity and disparity change at every frame, and the eyestrain feeling gets accumulated across frames but decays exponentially over time.

First, it is assumed there is an "instant eyestrain function" $g(D_{aver}^i, \delta D_{aver}^i)$ that relates the eyestrain caused by disparity with the average disparity $D_{aver}^i$ and disparity transition $\delta D_{aver}^i$. Then, if the disparity is kept at zero after the ith frame, the eyestrain measurement can be represented as a decaying model, as follows $$ES_i(t) = g(D_{aver}^i, \delta D_{aver}^i)\exp(-\lambda t) \quad (5)$$

Where $g(D_{aver}^i, \delta D_{aver}^i)$ is a function modeling the instant impact of the disparity to eyestrain. $\lambda$ is a decaying factor. This model assumes that eyestrain will quickly fade out over time given no more disparity is present on the screen (i.e. convergence point becomes focus point). Notice that the function $g(D_{aver}^i, \delta D_{aver}^i)$ could be different for the frames within segments and between segments since there could be abrupt changes of disparity between segments, that's why they are treated differently above. A simple example of the function $g(D_{aver}^i, \delta D_{aver}^i)$ may be a linear combination between $D_{aver}^i$ and $\delta D_{aver}^i$, as follows:

$$g(D_{aver}^i, \delta D_{aver}^i) = aD_{aver}^i + b\delta D_{aver}^i \quad (6)$$

where a and b are weighing coefficients that should be different for disparity transition within segments and between segments. Values of a and b can be determined empirically.

Figure 6:
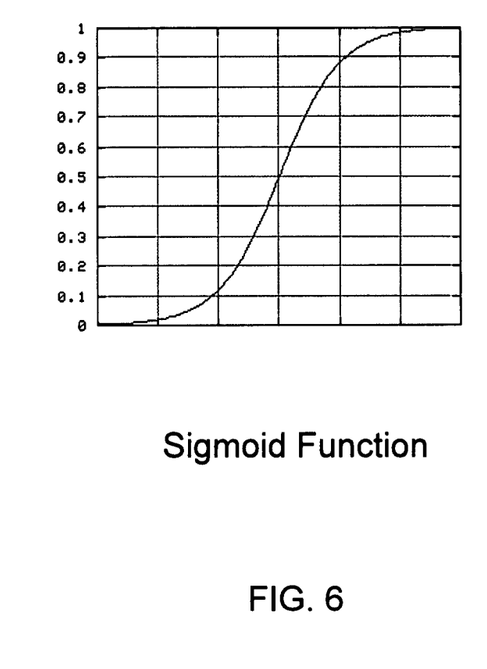
FIG. 6 illustrates a sigmoid function use to model the saturation of eyestrain feeling.

When the disparity keeps changing across frames, then, the eyestrain feeling should get accumulated over time. However, the eyestrain cannot go up forever, so a function can be employed to model the flat-out effect of the eyestrain feeling over time is used. A sigmoid function to model the saturation of the eyestrain feeling, as follows:

$$S(ES) = 1/(1+\exp(-ES)) \quad (7)$$

The shape of this function is shown in FIG. 6.

Given these elements, the overall eyestrain measure can be defined recursively at frame i as, as follows:

$$ES_i(t_i) = S(ES_{i-1}(t_{i-1})\exp(-\lambda(t_i - t_{i-1})) + g(D_{aver}^i, \delta D_{aver}^i)) \quad (8)$$

where $ES_i(t_i)$ is the eyestrain measure at the ith frame, and $t_i$ is the time of the (i)th frame, and $\lambda$ is a constant for controlling the decay speed. The computation of this measure can be realized by simulation over time.

Figure 7:
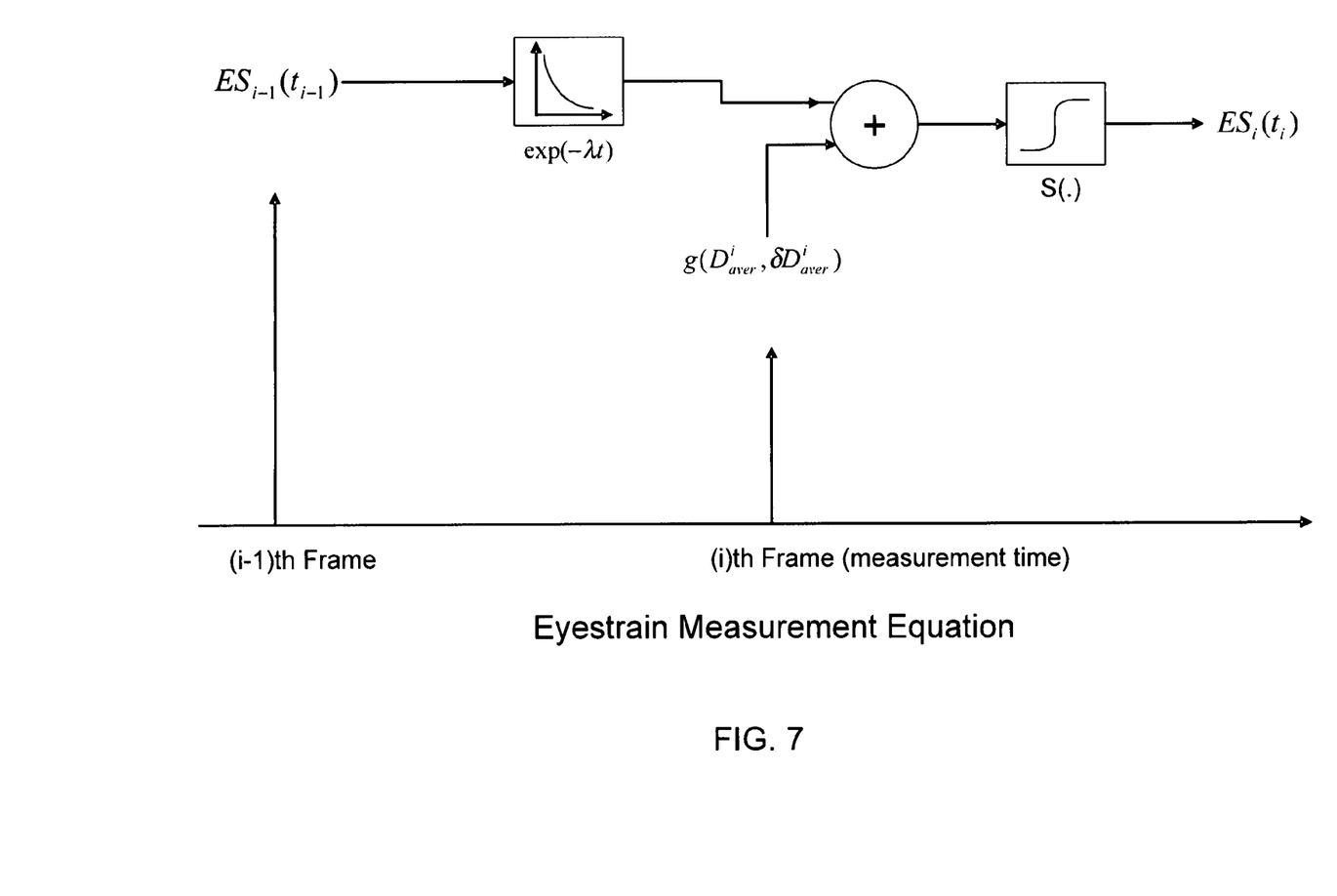
FIG. 7 illustrates an eyestrain measurement equation over time according to an aspect of the present disclosure.

FIG. 7 is an illustration of the eyestrain measurement equation over time. The eyestrain at the (i-t)th frame is determined and a decaying factor of $\exp(-\lambda t)$ is applied to the eyestrain measurement. The result is then combined with the instant eyestrain function of the (i)th frame. A sigmoid function is applied to the combination result to determine the eyestrain at the (i)th frame.

Figure 8:
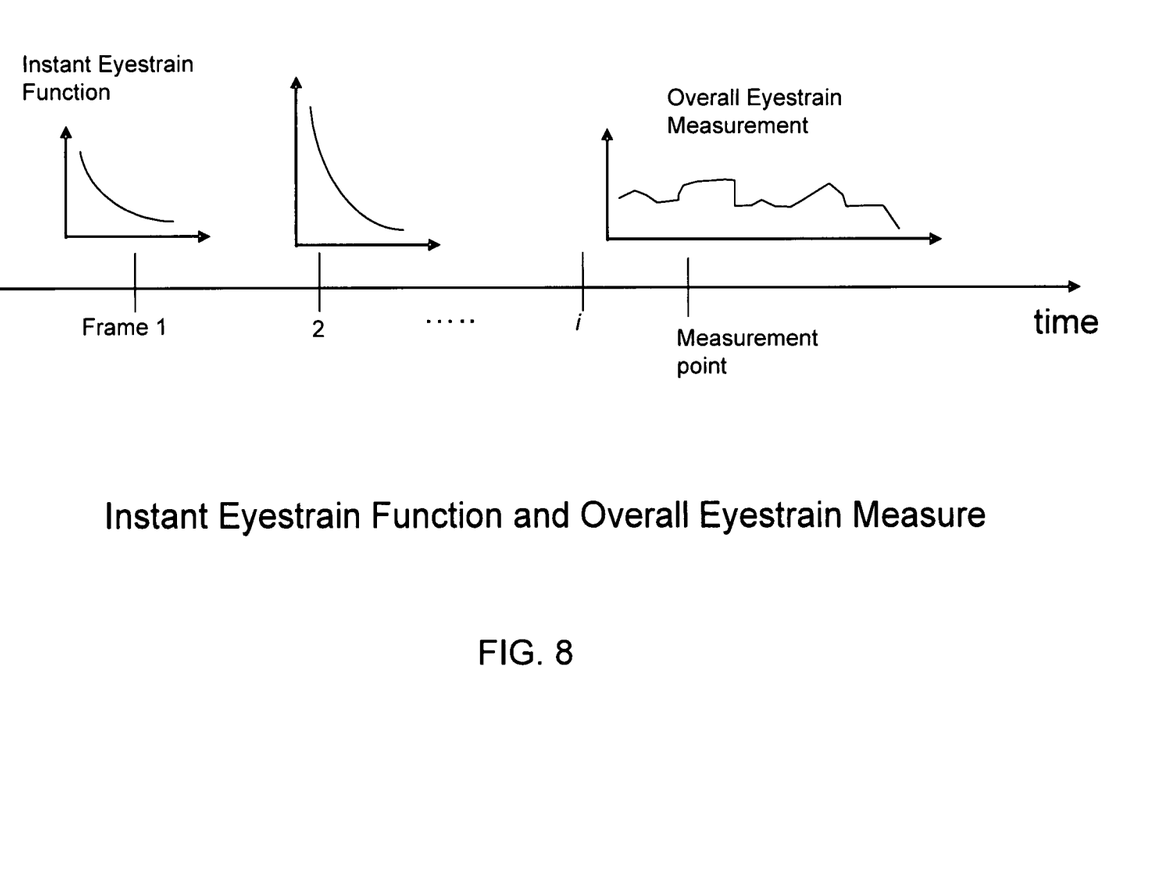
FIG. 8 illustrates an instant eyestrain function and overall eyestrain measurement according to an aspect of the present disclosure.

Referring to FIG. 8, an instant eyestrain function and overall eyestrain measurement are illustrated. The curve over each frame, e.g., frame 1, 2, etc., is the instant eyestrain function of that frame and the curve over the measurement point is accumulation of the instant eyestrain functions. Referring again to FIG. 5, in step 210 it is determined if the overall eyestrain experienced by a viewer is acceptable, In one embodiment, the overall eyestrain measurement is visualized as a graph to an operator, e.g., a director or editor, to determine if the eyestrain is too high or not according to the graph. In another embodiment, the overall eyestrain measurement can be compared to a predetermined threshold to determine if correction is required. For example, a curve is generated representing the overall eyestrain measurement and then the value of each point on the curve is compared to the predetermined threshold. In this embodiment, the predetermined threshold will be different for different types of scenes and movies.

If it is determined the eyestrain is too high, disparity correction or grading will be performed on the stereoscopic images to reduce the eyestrain, in step 212. Grading is a process of smoothing the disparity value across frames. By smoothing the disparity across frames, the abrupt change of the disparity can be reduced and, therefore, eyestrain can be reduced. An exemplary method for reducing disparity is called convergence adjustment, which is realized by shifting the right-eye image to the left or right to adjust the convergence point. By shifting the right-eye to the left or the right, the disparities of pixels can be artificially decreased or increased, resulting in smaller or larger overall depth, respectively.

The problem of image shifting is that the depth of all pixels is increased by the same amount, which has nothing to do with 3D scene geometry. However, if accurate depth maps are available, it's possible to synthesize a new view of a scene with a new virtual camera position to reduce the disparity. In this embodiment, the disparity value d for each scene point, determined above, is converted into depth value z, the distance from the scene point to the camera, by the depth map generator 123 using the following formula: $z = Bf/d$, where B is the distance between the two cameras, also called baseline, and f is the focal length of the camera. The depth values for each at least one image, e.g., the left eye view image, are stored in a depth map. The depth values of the depth map are accordingly changed to synthesize the new view while reducing the disparity of the images. For example, to create a new view, first the depth values are changed and then the new left or right (or both) images re-rendered. The re-render process takes the left (or right) image and the depth map and creates a new right (or left) image. The depth values are 3D information of the pixels, therefore, techniques, such as ray-tracing, to render the 3D points into 2D pixels in the new view can be used. The new view will have a smaller disparity or smaller disparity transition and, therefore, will result in reduced eyestrain to a viewer or audience.

Referring now to FIG. 4, the corresponding image and associated depth map are stored, e.g., in storage device 124, and may be retrieved for 3D playback. Furthermore, all corrected images of a motion picture or video clip can be stored with the associated depth maps in a single digital file 130 representing a stereoscopic version of the motion picture or clip. The digital file 130 may be stored in storage device 124 for later retrieval, e.g., to print a stereoscopic version of the original film.

Although embodiments which incorporates the teachings of the present disclosure have been shown and described in detail herein, those skilled in the art can readily devise many other varied embodiments that still incorporate these teachings. Having described preferred embodiments of a system and method for measuring the potential eyestrain felt while watching a 3D presentation (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method of measuring potential eyestrain while viewing a three-dimensional (3D) presentation, the method comprising:
    acquiring a first image and a second image from a first segment;
    estimating disparity of at least one point in the first image with at least one corresponding point in the second image;
    estimating disparity transition of a sequence of first and second images; and
    determining potential eyestrain while viewing the 3D presentation based on the disparity and the disparity transition of the sequence of the first and second images, the step of determining potential eyestrain further comprising:
        determining an instant eyestrain function for each frame of a sequence of first and second images; and
        applying a decaying factor to the instant eyestrain function for each frame of the sequence of first and second images.

2. The method as in claim 1, wherein the estimating the disparity transition step further comprises:
    estimating the disparity of a last frame of a previous segment;
    estimating the disparity of a first frame of the first segment; and
    determining the difference between the disparity of the last frame of the previous segment and the disparity of the first frame of the first segment.

3. The method as in claim 1, wherein the estimating the disparity transition step further comprises:
    estimating the disparity within each frame of a plurality of frames of the first segment; and
    determining the difference between the disparity of each of the frames of the first segment.

4. The method as in claim 1, wherein the determining potential eyestrain step further comprises accumulating the decayed instant eyestrain function for each frame of the sequence of first and second images over a predetermined period of time.

5. The method as in claim 4, wherein the determining potential eyestrain step further comprises saturating the accumulated the eyestrain function over the sequence of first and second images.

6. The method of claim 1, further comprising:
    determining if the potential eyestrain is acceptable; and
    if the potential eyestrain is not acceptable, correcting the disparity of the first and second image.

7. The method of claim 6, wherein the correcting step further comprises shifting at least one of the first and second images to adjust a convergence point of a viewer's eyes in relation to the first and second images.

8. The method of claim 6, wherein the correcting step further comprises synthesizing a new view of the first segment with reduced disparity.

9. A system for measuring potential eyestrain while viewing a three-dimensional (3D) presentation comprising:
    means for acquiring a first image and a second image from a segment;
    disparity estimator for estimating disparity of at least one point in the first image with at least one corresponding point in the second image;
    a disparity transition estimator for estimating disparity transition of a sequence of first and second images; and
    eyestrain estimator for determining potential eyestrain while viewing the 3D presentation based on the disparity and the disparity transition of the sequence of the first and second images, the determining potential eyestrain further comprising:
        determining an instant eyestrain function for each frame of a sequence of first and second images; and
        applying a decaying factor to the instant eyestrain function for each frame of the sequence of first and second images.

10. The system as in claim 9, wherein the disparity transition estimator is operative to estimate the disparity of a last frame of a previous segment, estimate the disparity of a first frame of the first segment, and determine the difference between the disparity of the last frame of the previous segment and the disparity of the first frame of the first segment.

11. The system as in claim 9, wherein the disparity transition estimator is operative to estimate the disparity within each frame of a plurality of frames of the first segment and determine the difference between the disparity of each of the frames of the first segment.

12. The system as in claim 9, wherein the eyestrain estimator is operative to accumulate the decayed instant eyestrain function for each frame of the sequence of first and second images over a predetermined period of time.

13. The system as in claim 12, wherein the eyestrain estimator is operative to saturate the accumulated the eyestrain function over the sequence of first and second images.

14. The system of claim 9, further comprising a disparity corrector operative to correct the disparity of the first and second images, if the eyestrain estimator determines the potential eyestrain is not acceptable.

15. The system of claim 14, wherein the disparity corrector is operative to shift at least one of the first and second images to adjust a convergence point of a viewer's eyes in relation to the first and second images.

16. The system of claim 14, wherein the disparity corrector is operative to synthesize a new view of the first segment with reduced disparity.

17. A non-transitory program storage device readable by a machine, tangibly embodying a program of instructions executable by the machine to perform method steps for measuring potential eyestrain while viewing a three-dimensional (3D) presentation, the method comprising:
    acquiring a first image and a second image from a first segment;
    estimating disparity of at least one point in the first image with at least one corresponding point in the second image;
    estimating disparity transition of a sequence of first and second images; and
    determining potential eyestrain while viewing the 3D presentation based on the disparity and the disparity transition of the sequence of the first and second images, the determining potential eyestrain further comprising:
        determining an instant eyestrain function for each frame of a sequence of first and second images; and
        applying a decaying factor to the instant eyestrain function for each frame of the sequence of first and second images.

18. The program storage device as in claim 17, wherein the method further comprises:
    determining if the potential eyestrain is acceptable; and
    if the potential eyestrain is not acceptable, correcting the disparity of the first and second image.

* * * * *